(12) United States Patent
Gotou

(10) Patent No.: US 10,664,754 B2
(45) Date of Patent: May 26, 2020

(54) INFORMATION PROCESSING APPARATUS

(71) Applicant: FANUC CORPORATION, Minamitsuru-gun, Yamanashi (JP)

(72) Inventor: Takefumi Gotou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 14 days.

(21) Appl. No.: 16/038,486

(22) Filed: Jul. 18, 2018

(65) Prior Publication Data
US 2019/0034803 A1  Jan. 31, 2019

(30) Foreign Application Priority Data

Jul. 25, 2017 (JP) ................. 2017-143977

(51) Int. Cl.
| | | |
|---|---|---|
| G06N 3/08 | (2006.01) | |
| G01D 5/54 | (2006.01) | |
| G06N 20/00 | (2019.01) | |
| G06N 3/04 | (2006.01) | |
| G06N 3/12 | (2006.01) | |

(52) U.S. Cl.
CPC ............... G06N 3/088 (2013.01); G01D 5/54 (2013.01); G06N 3/0454 (2013.01); G06N 20/00 (2019.01); G06N 3/0427 (2013.01); G06N 3/126 (2013.01)

(58) Field of Classification Search
CPC .................................................... G06N 3/088
See application file for complete search history.

(56) References Cited

U.S. PATENT DOCUMENTS

| | | | |
|---|---|---|---|
| 2011/0055087 A1* | 3/2011 | Chen-Ritzo | G06Q 30/0283 705/80 |
| 2016/0247092 A1 | 8/2016 | Watanabe | |
| 2018/0018585 A1* | 1/2018 | Marin | G06N 20/00 |

(Continued)

FOREIGN PATENT DOCUMENTS

| | | |
|---|---|---|
| CN | 105830060 A | 8/2016 |
| CN | 106844403 A | 6/2017 |
| JP | H06119291 A | 4/1994 |

(Continued)

OTHER PUBLICATIONS

P.M. Szecowka, "On reliability of neural network sensitivity analysis applied for sensor array optimization," 2011, Elsevier (Year: 2011).*

(Continued)

Primary Examiner — Vincent Gonzales
Assistant Examiner — Seth Andrew Raker
(74) Attorney, Agent, or Firm — RatnerPrestia

(57) ABSTRACT

An information processing apparatus generates multiple combinations of sensor data inputted to a machine learning apparatus, inputs the combinations of sensor data to the machine learning apparatus, and generates a recognizer corresponding to each of the combinations of sensor data. Further, the performance of the recognizers is evaluated in accordance with expected performance required for the recognizers, and the combinations of sensor data corresponding to the recognizers satisfying the expected performance are outputted. Thus, the rates of contribution of two or more pieces of sensor data inputted to the machine learning apparatus are evaluated, and the configuration of sensors is optimized.

9 Claims, 6 Drawing Sheets

(56) References Cited

U.S. PATENT DOCUMENTS

2019/0026630 A1* 1/2019 Ide .......................... G06N 3/08

FOREIGN PATENT DOCUMENTS

| | | |
|---|---|---|
| JP | H0749945 A | 2/1995 |
| JP | 6-102217 A | 4/1995 |
| JP | 2008293178 A | 12/2008 |
| JP | 2016114986 A | 6/2016 |

OTHER PUBLICATIONS

Notification of Reasons for Refusal for Japanese Application No. 2017-143977, dated Jan. 15, 2019, with translation, 7 pages.
Chinese Office Action for Chinese Application No. 201810828164.1, dated Dec. 10, 2019, with translation, 17 pages.

* cited by examiner

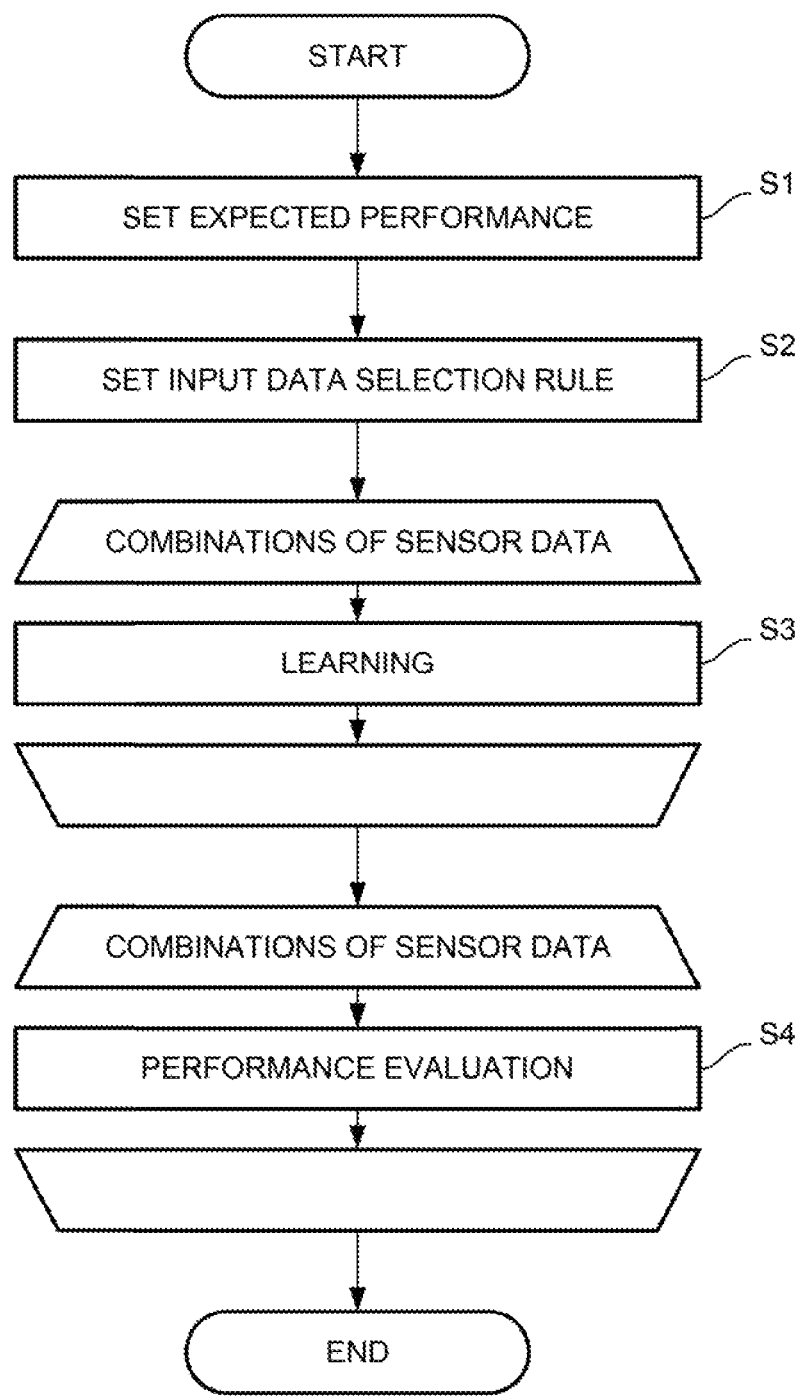

INFORMATION PROCESSING APPARATUS

CROSS-REFERENCE TO RELATED APPLICATION

This application is a new U.S. Patent Application that claims benefit of Japanese Patent Application No. 2017-143977, filed Jul. 25, 2017, the disclosure of the application is being incorporated herein by reference in its entirety for all purposes.

BACKGROUND OF THE INVENTION

1. Field of the Invention

The present invention relates to an information processing apparatus, and particularly to an information processing apparatus capable of evaluating the rates of contribution of a plurality of pieces of sensor data inputted to a machine learning apparatus and optimizing the configuration of sensors.

2. Description of the Related Art

In the control of machine tools and the like and related fields, machine learning apparatuses are widely used. For example, a machine learning apparatus can determine the presence or absence of a scratch on a workpiece based on input data obtained from a plurality of cameras that capture images of the workpiece. Further, a machine learning apparatus can perform anomaly detection on a motor based on input values such as the output value of a microphone, disturbance value of a current, and the output value of an acceleration sensor or the like.

Machine learning apparatuses are known which recognize a plurality of pieces of input data acquired from sensors and the like using a machine learning-based approach such as classification, regression, or clustering. Techniques for performing machine learning by combining a plurality of pieces of sensor data in this way are called sensor fusion. Some machine learning apparatuses that realize sensor fusion perform machine learning by receiving feature values such as SIFT and SURF extracted from data directly outputted by sensors and the like (such data will hereinafter be referred to as raw data), and some others perform machine learning by directly receiving raw data by deep machine learning.

One example of sensor fusion technique is described in Japanese Patent Application Laid-Open No. 6-102217. In that technique, output signals of a plurality of gas sensors are inputted to a neural network, and the type of gas is identified based on identification patterns learned by the neural network in advance.

With sensor fusion, by inputting various kinds of sensor data in combination, high-accuracy processing such as learning, recognition, or estimation can be realized. However, among a plurality of pieces of sensor data, an approach for systematically identifying sensor data having a high or low rate of contribution to the result of learning, recognition, or estimation and optimizing the configuration of sensors so that required performance may be satisfied is not provided yet. For example, if sensor data having a low rate of contribution to the result of learning, recognition, or estimation can be identified, monetary costs such as the prices of sensors themselves and the cost required for sensor data acquisition and the like can be reduced. Further, time, load, and the like required for measurement, acquisition, and processing of data can be reduced, and the result can be outputted fast.

SUMMARY OF THE INVENTION

The present invention has been made to solve the above-described problems, and an object of the present invention is to provide an information processing apparatus that can evaluate the rates of contribution of a plurality of pieces of sensor data inputted to a machine learning apparatus and optimize the configuration of sensors.

An information processing apparatus according to one aspect of the present invention includes a machine learning apparatus configured to receive a plurality of different pieces of sensor data and perform machine learning. The information processing apparatus includes: an input data control section configured to set a selection rule for generating one or more combinations of the sensor data; an input data selection section configured to generate a plurality of combinations of the sensor data in accordance with the selection rule, input the combinations of the sensor data to the machine learning apparatus, and generate a recognizer corresponding to each of the combinations of the sensor data; an expected-performance setting section configured to set expected performance required for the recognizers; and a performance evaluation section configured to evaluate performance of the recognizers in accordance with the expected performance and output the combination of the sensor data corresponding to the recognizer satisfying the expected performance.

The expected performance may be defined using cost for acquiring the sensor data, and the cost for acquiring the sensor data may be calculated based on a price of a sensor for acquiring the sensor data, a degree of difficulty of installation of the sensor, or expense, time, or processing load required for acquiring or processing the sensor data.

The expected performance may be defined using correct answer rate, precision rate, recall, or F value of the recognizer.

The sensor data may concern temperature, displacement, pressure, current, speed, acceleration, image, illuminance, audio, smell, or length.

The performance evaluation section may include an interface configured to display a plurality of combinations of the sensor data, the combinations satisfying the expected performance, and allow a user to select a desired combination of the sensor data.

The recognizer may include a neural network.

The input data control section may further set a setting rule for a configuration of an intermediate layer of the neural network.

The input data control section may have the selection rule for deleting the sensor data having a small coupling coefficient between an input layer and an intermediate layer in the neural network.

The input data control section may have the selection rule for deleting the sensor data having a low rate of contribution of an intermediate layer to firing at the time of recognition in the neural network.

The sensor data may be collected from one or more sensors through a communication network.

The present invention can provide an information processing apparatus that can evaluate the rates of contribution of a plurality of pieces of sensor data inputted to a machine learning apparatus and optimize the configuration of sensors.

BRIEF DESCRIPTION OF THE DRAWINGS

FIG. 5 is a flowchart showing a flow of the operation of the information processing apparatus shown in FIG. 2.

DETAILED DESCRIPTION OF THE PREFERRED EMBODIMENTS

First, an information processing apparatus according to Embodiment 1 of the present invention will be described.

Figure 1:
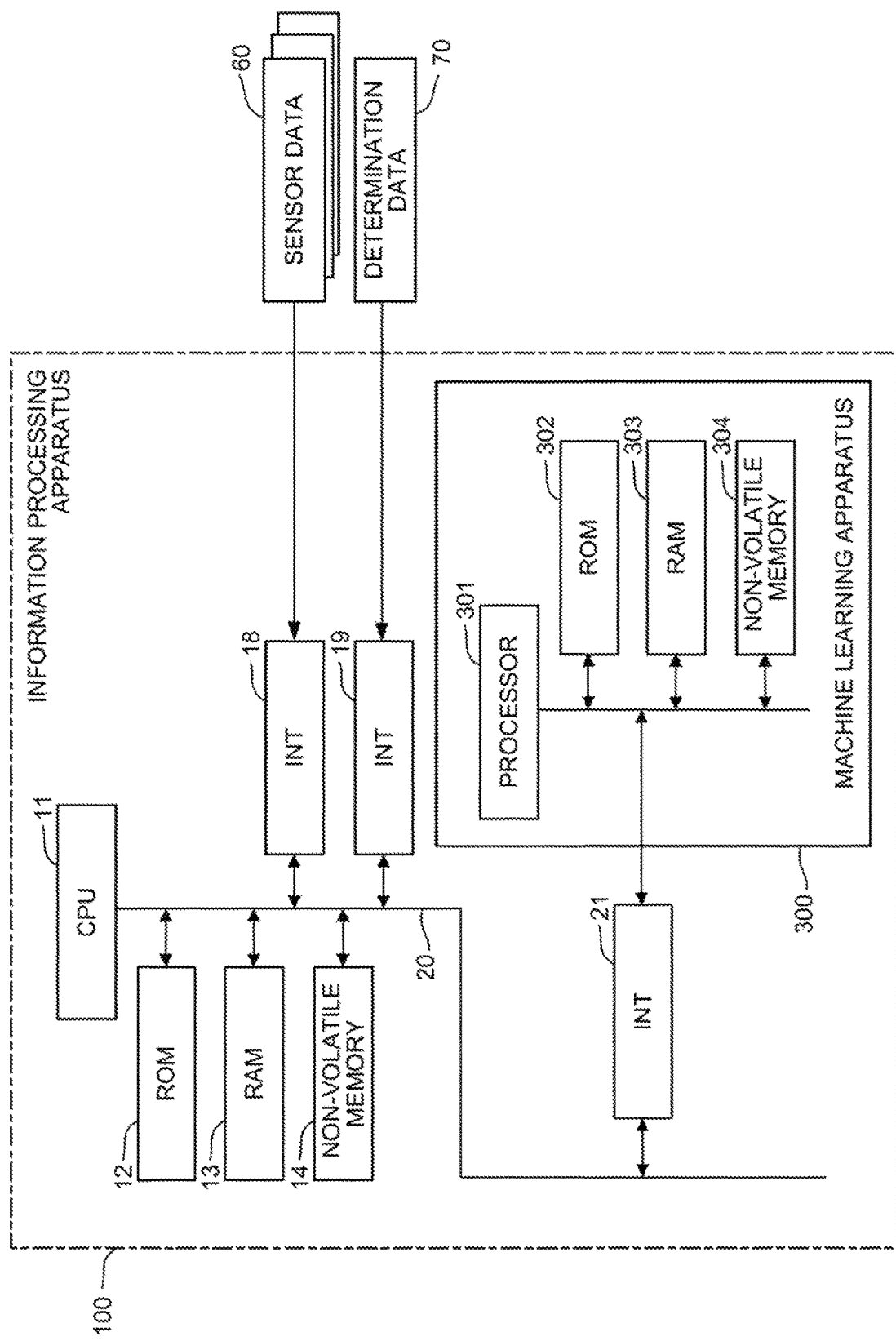
FIG. 1 is a block diagram showing the hardware configuration of an information processing apparatus according to Embodiment 1 of the present invention.

FIG. 1 is a block diagram showing the hardware configuration of an information processing apparatus 100 according to Embodiment 1 of the present invention.

A CPU 11 is a processor that wholly controls the information processing apparatus 100. The CPU 11 retrieves a system program stored in a ROM 12 through a bus 20, and controls the entire information processing apparatus 100 in accordance with the system program. A RAM 13 temporarily stores data such as temporary calculation data or display data and various kinds of data inputted from the outside.

A non-volatile memory 14 is configured as a memory that maintains the state of memory using, for example, an unillustrated battery for memory backup even when the power of the information processing apparatus 100 is shut off. The non-volatile memory 14 stores various kinds of programs and data inputted through an unillustrated interface. Such programs and data stored in the non-volatile memory 14 may be loaded into the RAM 13 at the time of execution or use. The ROM 12 has various system programs prewritten therein.

Sensor data 60 are measured values (sensor data) outputted by sensors that measure various states of an environment. For example, a temperature sensor, a displacement sensor, a pressure sensor, a current sensor, a speed sensor, an acceleration sensor, a camera, an illuminance sensor, a microphone, a smell sensor, a length measure, and the like output the sensor data 60. The present embodiment includes two or more sensors, and the sensors each output different types of sensor data. For example, the sensor data 60 can be a combination of audio data outputted by a microphone, acceleration data outputted by an acceleration sensor, image data outputted by a camera for capturing an image of a top surface of a workpiece, and image data outputted by a camera for capturing an image of a side surface of the workpiece. The information processing apparatus 100 receives the sensor data 60 through an interface 18, and passes the sensor data 60 to the CPU 11.

Determination data 70 are data learned in association with the sensor data 60 in machine learning. For example, in the case where a machine learning model for performing motor anomaly detection using the sensor data 60 is generated, when the sensor data 60 is inputted to the interface 18, data indicating the normality or abnormality of a motor, which are the determination data 70, are inputted to the interface 19. For example, in the case where an operator recognizes the normality or abnormality of the motor and inputs the result of recognition to a keyboard, the information processing apparatus 100 receives data outputted from the keyboard as the determination data 70 through the interface 19, and passes the determination data 70 to the CPU 11.

An interface 21 is an interface for connecting the information processing apparatus 100 and a machine learning apparatus 300. The machine learning apparatus 300 includes a processor 301 for controlling the entire machine learning apparatus 300, a ROM 302 storing system programs and the like, a RAM 303 for storing temporary data in processes involved in machine learning, and a non-volatile memory 304 for storing a learning model and the like. The machine learning apparatus 300 can observe, through the interface 21, various kinds of sensor data that the information processing apparatus 100 can acquire. It should be noted that the processor and the ROM of the machine learning apparatus 300 may be the same as those of the information processing apparatus 100. Further, the processor may have a GPU or an FPGA or both to increase the processing speed.

Figure 2:
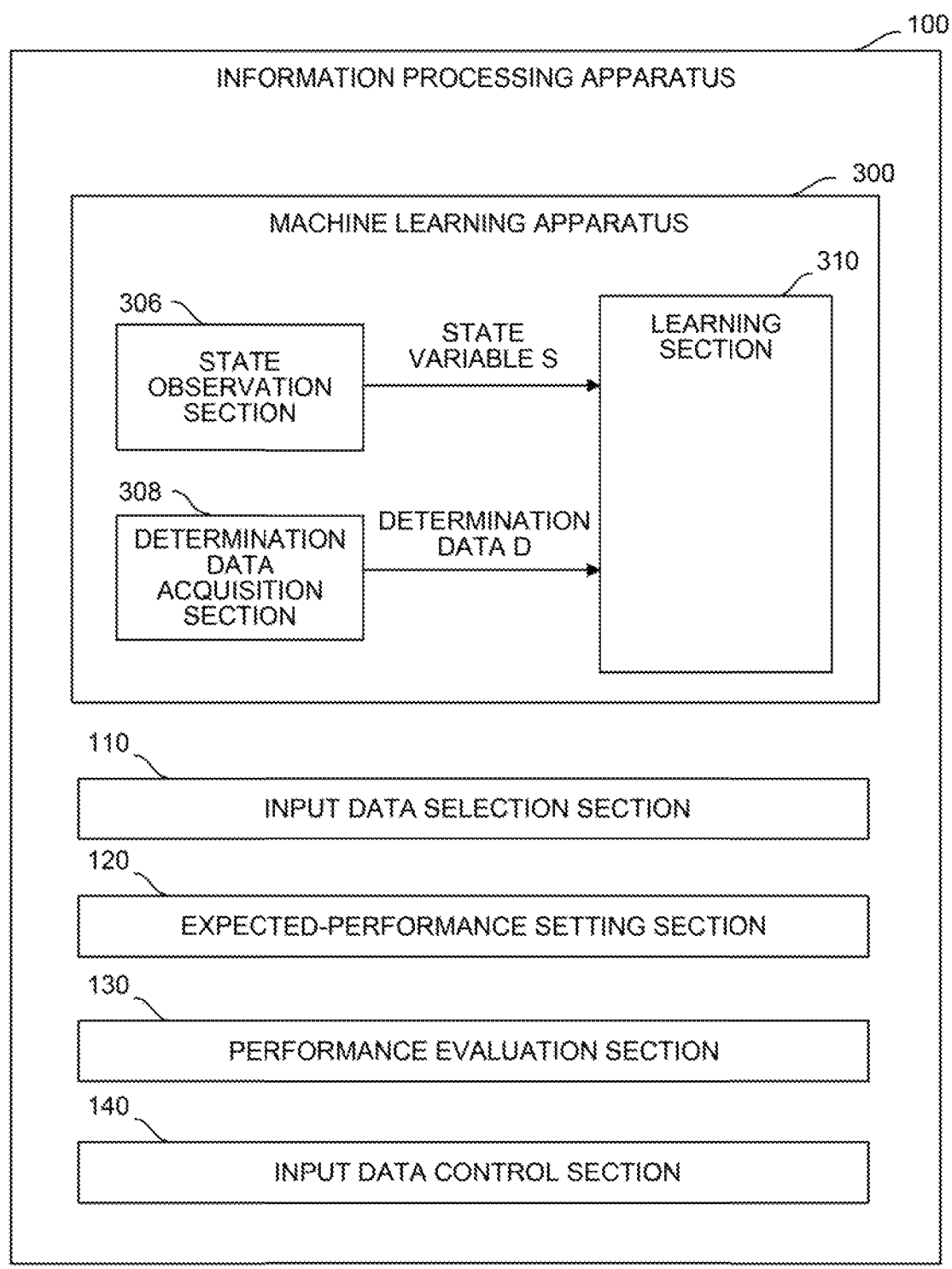
FIG. 2 is a schematic functional block diagram of the information processing apparatus in FIG. 1.

FIG. 2 is a schematic functional block diagram of the information processing apparatus 100. The information processing apparatus 100 includes the machine learning apparatus 300, an input data selection section 110, an expected-performance setting section 120, a performance evaluation section 130, and an input data control section 140.

The machine learning apparatus 300 of the information processing apparatus 100 includes software (learning algorithm and the like) and hardware (such as the processor 301) for spontaneously learning the correlation between the sensor data 60 and the determination data 70 by so-called machine learning. What is learned by the machine learning apparatus 300 corresponds to a model structure representing the correlation between the sensor data 60 and the determination data 70.

The machine learning apparatus 300 includes a state observation section 306 for observing the sensor data 60 as a state variable S representing the current state of an environment, a determination data acquisition section 308 for acquiring the determination data 70 as determination data D, and a learning section 310 for performing learning by associating the sensor data 60 with the determination data 70 using the state variable S and the determination data D.

The state observation section 306 may be configured as one function of the processor 301 or may be configured as software stored in the ROM 302 to cause the processor 301 to work. Also, the determination data acquisition section 308 may be configured as one function of the processor 301 or may be configured as software stored in the ROM 302 to cause the processor 301 to work.

The learning section 310 may be configured as one function of the processor 301 or may be configured as software stored in the ROM 302 to cause the processor 301 to work. The learning section 310 learns the correlation between the sensor data 60 and the determination data 70 in accordance with any learning algorithm which is collectively referred to as machine learning. The learning section 310 can repeatedly execute learning based on a data collection including the state variable S and the determination data D described above.

By repeating the above-described learning cycle, the learning section 310 can automatically identify features implying the correlation between the sensor data 60 and the determination data 70. When the learning algorithm is started, the correlation between the sensor data 60 and the determination data 70 is substantially unknown, but the learning section 310 gradually identifies features and interprets the correlation as learning progresses. When the correlation between the sensor data 60 and the determination data 70 is interpreted to some reliable level, learning results repeatedly outputted by the learning section 310 become capable of being used to estimate what the determination data 70 should be for the current state (sensor data 60). Specifically, as the learning algorithm progresses, the learning section 310 can gradually approach the correlation between the sensor data 60 and the determination data 70 toward an optimal solution.

As described above, in the machine learning apparatus 300 of the information processing apparatus 100, the learning section 310 learns the correlation between the sensor data 60 and the determination data 70 in accordance with a machine learning algorithm using the state variable S observed by the state observation section 306 and the determination data D acquired by the determination data acquisition section 308. The state variable S includes data insusceptible to disturbance, and the determination data D is unambiguously determined. Accordingly, with the machine learning apparatus 300 of the information processing apparatus 100, the determination data 70 corresponding to the sensor data 60 can be automatically and correctly found using results of learning by the learning section 310, not by calculation or guessing.

In the machine learning apparatus 300 having the above-described configuration, the learning algorithm that the learning section 310 executes is not particularly limited, and any learning algorithm publicly known as machine learning can be employed.

Figure 3:
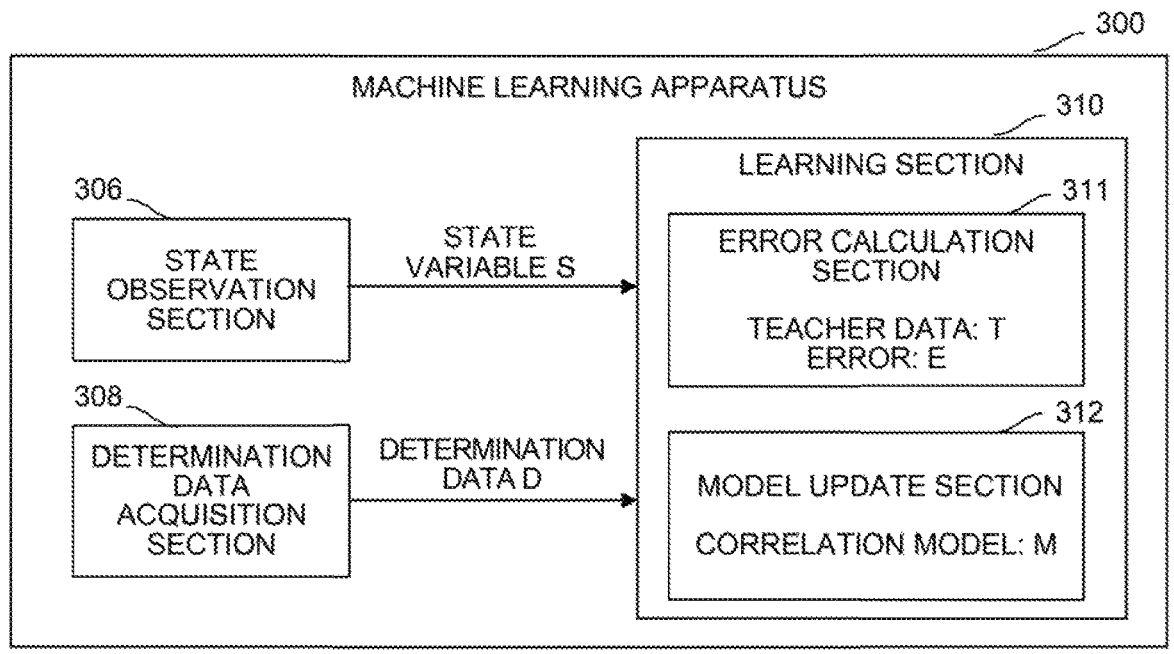
FIG. 3 is a block diagram showing the configuration of one aspect of a machine learning apparatus in the information processing apparatus shown in FIG. 2.

FIG. 3 shows the configuration of one aspect of the machine learning apparatus 300 in the information processing apparatus 100 shown in FIG. 2 which includes the learning section 310 that executes supervised learning as one example of a learning algorithm.

Supervised learning is a method for learning a correlation model for estimating a required output (determination data 70 corresponding to the sensor data 60) for a new input by preparing a huge amount of known data sets (called teacher data), each of which includes an input and an output corresponding to the input, in advance and identifying a feature implying the correlation between input and output from the teacher data.

In the machine learning apparatus 300 shown in FIG. 3, the learning section 310 includes an error calculation section 311 for calculating an error E between a correlation model M for deriving the determination data 70 from the state variable S and a correlation feature identified from teacher data T prepared in advance, and a model update section 312 for updating the correlation model M so that the error E may be reduced. The learning section 310 learns the correlation between the sensor data 60 and the determination data 70 by the model update section 312 repeating the updating the correlation model M.

The correlation model M can be constructed by regression analysis, reinforcement learning, deep machine learning, or the like. An initial value of the correlation model M is, for example, a value expressing the correlation between the state variable S and the determination data D in a simplified manner, and is given to the learning section 310 before the start of supervised learning. The teacher data T can be configured using, for example, empirical values (known data set of the sensor data 60 and the determination data 70) accumulated by recording past correspondence relations between the sensor data 60 and the determination data 70, and are given to the learning section 310 before the start of supervised learning. The error calculation section 311 identifies a correlation feature implying the correlation between the sensor data 60 and the determination data 70 based on a huge amount of teacher data T given to the learning section 310, and finds an error E between the correlation feature and the correlation model M corresponding to the state variable S in the current state. The model update section 312 updates the correlation model M so that the error E may be reduced, in accordance with, for example, predetermined update rules.

In the next learning cycle, the error calculation section 311 uses the state variable S and the determination data D obtained by, for example, operating a machine tool or the like in accordance with the updated correlation model M to find an error E for the correlation model M corresponding to the state variable S and the determination data D, and the model update section 312 updates the correlation model M again. This gradually reveals the correlation between the current environmental state (sensor data 60) that has been unknown and the state (determination data 70) corresponding to the current environmental state. In other words, by updating the correlation model M, the relationship between the sensor data 60 and the determination data 70 gradually approaches toward the optimal solution.

Figure 4A:
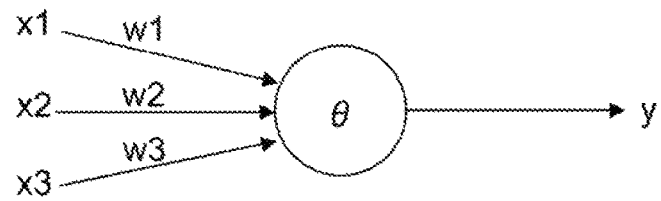
FIG. 4A is a diagram for explaining a neuron.
Figure 4B:
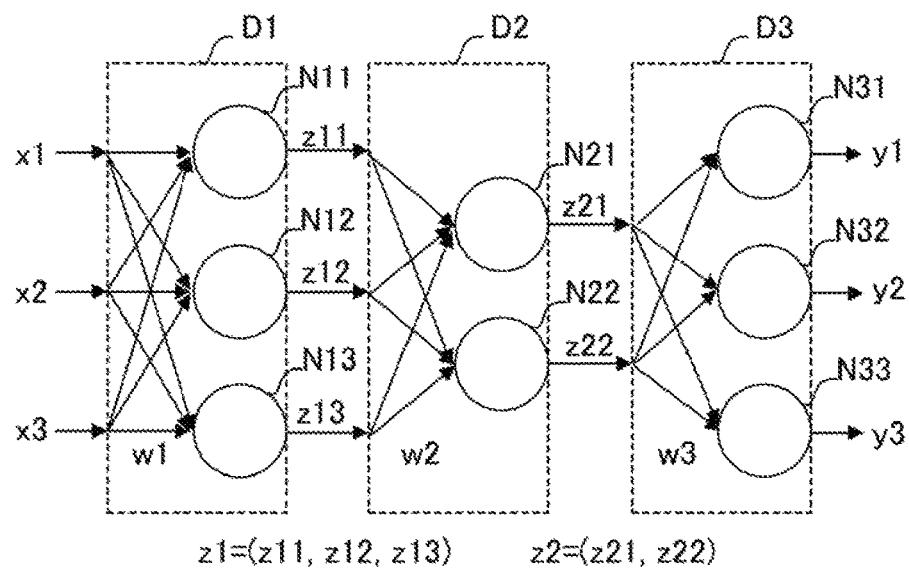
FIG. 4B is a diagram for explaining a neural network.

To advance the aforementioned supervised learning, for example, a neural network can be used. FIG. 4A schematically shows a model of a neuron. FIG. 4B schematically shows a model of a three-layer neural network configured by combining neurons shown in FIG. 4A. A neural network can be configured using, for example, an arithmetic unit, a memory unit, and the like that replicate a model of a neuron.

The neuron shown in FIG. 4A is configured to output a result y for a plurality of inputs x (here, as one example, inputs $x_1$ to $x_3$). Each of the inputs $x_1$ to $x_3$ is given a weight w ($w_1$ to $w_3$) corresponding to the input x. This causes the neuron to output a result y expressed by the following expression (1). It should be noted that all of the input x, the result y, and the weight w are vectors in expression (1). Further, θ is a bias, and $f_k$ is an activating function.

$$y = f_k(\Sigma_{i=1}^{n} x_i w_i - \theta) \quad (1)$$

The three-layer neural network shown in FIG. 4B receives a plurality of inputs x (here, as one example, inputs x1 to x3) from the left side and outputs results y (here, as one example, results y1 to y3) from the right side. In the illustrated example, the inputs x1, x2, and x3 are multiplied by corresponding weights (collectively expressed as w1), and each of the inputs x1, x2, and x3 is inputted to three neurons N11, N12, and N13.

In FIG. 4B, outputs from the neurons N11 to N13 are collectively represented by z1. z1 can be regarded as a feature vector obtained by extracting feature values of an input vector. In the illustrated example, each element of the feature vector z1 is multiplied by corresponding weights (collectively represented by w2), and each element of the feature vector z1 is inputted to two neurons N21 and N22. The feature vector z1 represents a feature between the weight w1 and the weight w2.

In FIG. 4B, outputs from the neurons N21 and N22 are collectively represented by z2. z2 can be regarded as a feature vector obtained by extracting feature values of the feature vector z1. In the illustrated example, each element of the feature vector z2 is multiplied by corresponding weights (collectively represented by w3), and each element of the feature vector z2 is inputted to three neurons N31, N32, and N33. The feature vector z2 represents a feature between the weight w2 and the weight w3. Finally, the neurons N31 to N33 output results y1 to y3, respectively.

In the machine learning apparatus 300, the learning section 310 can output the determination data 70 as an estimate (result y) by performing multi-layer calculation in accordance with the above-described neural network using the state variable S as the input x. It should be noted that operation modes of the neural network includes a learning mode and a determination mode. For example, weights w are learned using a learning data set in the learning mode, and shape data can be determined using the learned weights w in the determination mode. It should be noted that in the determination mode, detection, classification, reasoning, and the like can also be performed.

Referring back to FIG. 2, other components of the information processing apparatus 100 will be described. The input data selection section 110, the expected-performance setting section 120, the performance evaluation section 130, and the input data control section 140 are components specific to the present invention, and perform processing for evaluating the rates of contribution of a plurality of pieces of sensor data.

The expected-performance setting section 120 retains settings for expected performance required for the machine learning apparatus 300. The expected-performance setting section 120 may include a user interface that a user uses to input settings for expected performance and a storage area for retaining the settings. Expected performance can be set using various measures or the like that can be objectively evaluated. Typical examples of expected performance include correct answer rate, recall rate, precision rate, and F value. Correct answer rate is the fraction of events correctly determined by the machine learning apparatus 300 over the total number of events for which the machine learning apparatus 300 determined whether or not the events were actually A. Recall rate is the fraction of the number of events for which the machine learning apparatus 300 outputted A as an answer over the number of events that are actually A. Precision rate is the fraction of the number of events that are actually A over the number of events for which the machine learning apparatus 300 outputted A as an answer. F value is the harmonic mean of precision rate and recall rate. For example, a recall rate of 99.99% or more and a precision rate of 99% or more can be set as expected performance.

Expected performance can also be defined using other various measures. For example, cost for realizing a configuration of sensors is also an important performance measure. Cost includes monetary cost and other costs such as labor and time for acquiring sensor data. Examples of components of the cost include the price of a sensor itself, the degree of difficulty of installation of a sensor, the measurement time required for acquiring sensor data, and the like. For example, such components may be used to set, as expected performance, the condition that the total cost, including the prices of sensors themselves and the cost for image acquisition, is minimum with recall rate and precision rate being not less than predetermined threshold values. In this case, an evaluation formula for evaluating the total cost is defined first. For example, the smaller the total cost, the better the evaluation value outputted by the evaluation formula. Further, the condition that the evaluation value is not less than a predetermined threshold value may be set as expected performance. Alternatively, the condition that the evaluation value is better than those of other sensor configurations may is set as expected performance. For example, giving a weight of +20 when sensor data outputted by a high-resolution camera (the price of the sensor itself is relatively high, and time and load required for image processing are large) is used, weight of +10 when sensor data outputted by a low-resolution camera (the price of the sensor itself is relatively low, and time and load required for image processing are small) is used, and weight of +1 every time an image is captured (time and load for image processing are required), accumulated sum of those weights are set as an evaluation value, and such an evaluation value as set in this way being the smallest is set as an expected performance.

The input data control section 140 determines selection rules for sensor data that are inputted to the machine learning apparatus 300, and gives the determined selection rules to the input data selection section 110. The input data control section 140 may retain some typical selection rules in advance and include a user interface that a user uses to employ a desired selection rule among the typical selection rules. A selection rule means a rule for selecting m (m≤n) types of sensor data from n types of the sensor data 60 inputted to the information processing apparatus 100 and generating a plurality of different combinations. A simplest selection rule is to randomly determine combinations of sensor data. At this time, combinatorial optimization may be performed based on a result of performance evaluation described below, using a genetic algorithm. Further, in the case where the learning section 310 of the machine learning apparatus 300 is composed of a neural network, combinations of sensor data may be generated by, for example, evaluating coupling coefficients between an input layer and a next intermediate layer after learning is performed once using all pieces of sensor data and preferentially excluding input data for which the sum of coupling coefficients is small. Moreover, combinations of sensor data may be generated by trying recognition by a neural network using test sensor data after learning is performed once using all pieces of sensor data as in the foregoing and preferentially excluding input data for which the rate of contribution of the intermediate layer to firing is small at that time.

The input data selection section 110 determines combinations of sensor data in accordance with the selection rule determined by the input data control section 140, and executes machine learning for each of the combinations. For example, in the case where the selection rule is random, the input data selection section 110 defines a plurality of unique combinations of m (m≤n) types of sensor data based on n types of sensor data 60 entering the information processing apparatus 100. The input data selection section 110 extracts sensor data from the sensor data 60 entering the information processing apparatus 100 in accordance with the defined combinations, and inputs the extracted sensor data to the machine learning apparatus 300.

The machine learning apparatus 300 performs learning using the inputted sensor data as the state variable S and constructs a learning model. The input data selection section 110 sequentially executes this learning process for each of the defined combinations, and constructs a learning model corresponding to the combination. If the input data selection section 110 defines p combinations of sensor data, p learning results are obtained.

The performance evaluation section 130 evaluates each of the learning results obtained for the combinations of sensor data defined by the input data selection section 110. The evaluation is intended to determine whether or not the expected performance set in the expected-performance setting section 120 is achieved. Specifically, if the machine learning apparatus 300 as a learner has obtained sufficient pieces of learning data and then completed a learning process, the performance evaluation section 130 inputs test data (sensor data for test) to the machine learning apparatus 300 as a recognizer. The performance evaluation section 130 evaluates recognition results outputted by the machine learning apparatus 300 in light of the above-described expected performance. For example, in the case where the expected performance is defined as a correct answer rate of 99% or more in the expected-performance setting section 120 and where the performance evaluation section 130 inputs 100 pieces of test data to the machine learning apparatus 300, the performance evaluation section 130 determines whether correct results have been obtained for 99 or more pieces of test data, and determines that the expected performance is satisfied if correct results have been obtained for 99 or more pieces of test data. The performance evaluation section 130 performs this performance evaluation for all of the combinations of sensor data defined by the input data selection section 110. If p combinations of sensor data are defined, performance evaluation is performed for each of p learning results.

The performance evaluation section 130 outputs a result of performance evaluation. For example, among the combinations of sensor data that satisfy the expected performance, the combination of sensor data that has been evaluated to be the most excellent may be automatically selected and outputted. The performance evaluation section 130 may include a user interface that, if two or more combinations of sensor data satisfy the expected performance, displays the combinations to a user and allows the user to select a desired one.

Referring to the flowchart in FIG. 5, the operation of the information processing apparatus 100 shown in FIG. 2 will be described.

Step S1: The expected-performance setting section 120 sets expected performance required for the machine learning apparatus 300.

Step S2: The input data control section 140 sets a selection rule for sensor data.

Step S3: The input data selection section 110 determines combinations of sensor data in accordance with the selection rule set in step S2 and inputs the determined combinations to the machine learning apparatus 300. The machine learning apparatus 300 performs learning using the inputted combinations of sensor data.

It should be noted that if two or more combinations of sensor data meet the selection rule, the learning in step S3 is sequentially executed for each of the combinations.

Step S4: The performance evaluation section 130 performs performance evaluation on the machine learning apparatus 300 that has performed learning in step S3, based on the expected performance set in step S1 using test data.

It should be noted that if learning has been performed using two or more combinations of sensor data in step S3, the performance evaluation in step S4 is sequentially executed for each of learning models corresponding to those combinations of sensor data.

The performance evaluation section 130 outputs combinations of sensor data which have been determined to meet the expected performance as the result of performance evaluation.

In the present embodiment, the input data selection section 110 defines a plurality of combinations of sensor data in accordance with the selection rule set by the input data control section 140, and the machine learning apparatus 300 tries machine learning for each of the combinations. The performance evaluation section 130 outputs the combinations that satisfy the expected performance set by the expected-performance setting section 120, among learning results obtained for the respective combinations of sensor data. The combinations of sensor data outputted by the performance evaluation section 130 are composed of a smaller number of types of sensor data than the number of types of sensor data initially inputted to the information processing apparatus 100. Accordingly, in the case where the machine learning apparatus 300 is used in the control of a machine tool or the like or a related field after that, inputting combinations of sensor data outputted by the performance evaluation section 130 makes it possible to reduce monetary costs such as the prices of sensors themselves and the cost required for sensor data acquisition and the like and also reduce time, load, and the like required for measurement, acquisition, and processing of data to enable the result to be outputted fast.

Next, an example in which the information processing apparatus 100 according to Embodiment 1 is applied to workpiece scratch inspection will be described with reference to FIG. 6.

A robot controller 40 as the information processing apparatus 100 controls a robot 41, a camera 42 (high-resolution camera or low-resolution camera), and a light 43. The robot 41 grips a workpiece 45 with a hand 44 and rotates the workpiece 45 in various directions. The high-resolution camera or the low-resolution camera is selected in accordance with directions from the robot controller 40, and images of the workpiece 45 are captured from various directions. The light 43 illuminates the workpiece 45 in accordance with directions from the robot controller 40 when images are captured. In this example of application, the camera 42 includes two types of cameras, a high-resolution camera and a low-resolution camera; the light 43 has two states, ON and OFF; and there are 100 candidates for the postures for gripping the workpiece 45 with respect to the camera 42.

Figure 6:
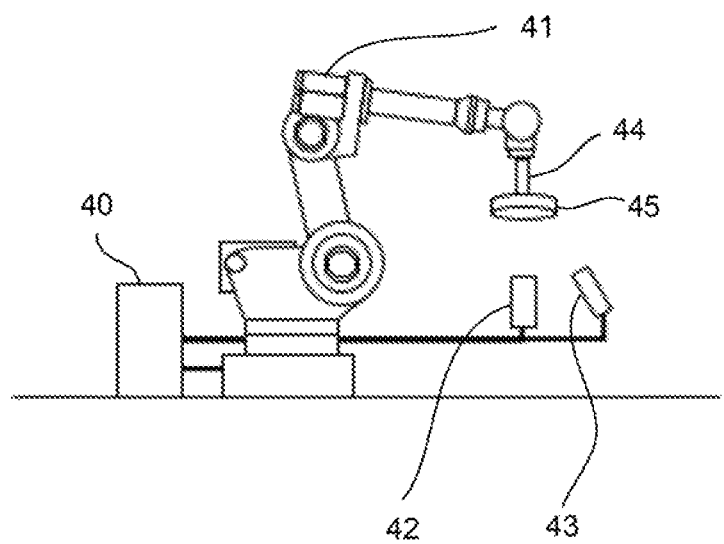
FIG. 6 is a view for explaining an example in which the information processing apparatus according to Embodiment 1 is applied to workpiece scratch inspection.

The machine learning apparatus 300 of the information processing apparatus 100 of the example of application in FIG. 6 performs supervised learning using image data captured by cameras as the sensor data 60 and using data indicating the presence or absence of a scratch as the determination data 70. In the course of learning, combinations of various numbers of images obtained by capturing, under various image capture conditions, images of a workpiece for which the presence or absence of a scratch is known in advance are given.

First, the expected-performance setting section 120 sets expected performance. In this example, the following conditions are set as expected performance: recall rate is 99.99% or more, precision rate is 99% or more, and an evaluation value calculated by an original evaluation formula for evaluating cost performance is the most excellent. With this expected performance, a combination of image capture conditions can be obtained which has recall rate and precision rate satisfying requirements and which has most excellent cost performance. The evaluation formula for evaluating cost performance is a sum of weights, where a weight for image capture using the high-resolution camera is +20, a weight for image capture using the low-resolution camera is +10, and a weight for each image captured is +1. The calculated value (sum of weights) of this evaluation formula decreases with increasing cost performance.

Then, the input data control section 140 sets a selection rule for combinations of sensor data. In this example of application, combinations (high or low resolution of the camera 42, the ON or OFF state of the light 43, the types and the number of postures for gripping the workpiece 45) of image capture conditions are randomly selected.

Subsequently, the input data selection section 110 randomly determines a combination (high or low resolution of the camera 42, the ON or OFF state of the light 43, the types and the number of postures for gripping the workpiece 45) of image capture conditions. The input data selection section 110 captures various images of the workpiece 45 in the determined combination of image capture conditions, and inputs a large number of pairs of image data as the state variable S and the presence or absence of a scratch on the workpiece 45 as the determination data D to the machine learning apparatus 300 as a learner. Thus, a learning model for estimating the presence or absence of a scratch based on image data in the combination of image capture conditions is generated.

The input data selection section 110 similarly performs learning for all of randomly-generated combinations of image capture conditions. Thus, a number of learning models which is equal to the number of randomly-generated combinations of image capture conditions are generated. It should be noted that at this time, instead of individually generating a learning model for each of the combinations of image capture conditions, one learning model in which the number of dimensions is increased by the number of combinations of image capture conditions can be generated by, for example, adding identifiers for combinations of image capture conditions to the state variable S. Either method may be freely employed. In this example of application, the former method is employed. Further, all pieces of image data that are used in learning and performance evaluation may be captured in advance, and image data to be used may be selected from all pieces of image data in accordance with the combination of image capture conditions.

Finally, the performance evaluation section 130 performs performance evaluation on all the generated learning models. Specifically, a large number of test images captured in the same combination of image capture conditions as that given at the time of learning are inputted to each of the learning models so that the learning model may output a recognition result (that is, the result of estimating whether a scratch is present or not). The performance evaluation section 130 cross-checks this recognition result against a correct answer (presence or absence of a scratch) to calculate recall rate, precision rate, and cost performance (calculated value of the aforementioned evaluation formula). When the performance evaluation section 130 finishes calculating recall rate, precision rate, and cost performance (calculated value of the aforementioned evaluation formula) for all the learning models, the performance evaluation section 130 identifies a learning model which has a recall rate of 99.99% or more and a precision rate of 99% or more and in which the calculated value of the evaluation formula for cost performance is the smallest. The performance evaluation section 130 outputs, as a combination of image capture conditions which has the most excellent performance, the combination of image capture conditions in the learning model thus identified. For example, image capture conditions in which the low-resolution camera is used, light is ON, and image capture is performed in 50 predetermined gripping postures can be outputted.

Suppose that the presence or absence of a scratch has been heretofore recognized using the high-resolution camera, with the light being ON and OFF, and using 200 images captured in 100 gripping postures. This example is assumed to reveal that image capture using the low-resolution camera, with the light being ON, and in 50 predetermined gripping postures achieves a predetermined recognition accuracy. In this case, using the low-resolution camera 42 instead of the high-resolution camera 42 makes it possible to maintain equivalent recognition accuracy while reducing monetary cost. Moreover, time and processing load required for image capture and image processing are also greatly reduced.

Next, an example in which the information processing apparatus 100 according to Embodiment 1 is applied to motor anomaly detection will be described with reference to FIG. 7.

A robot controller 40 as the information processing apparatus 100 controls a robot 41. At this time, a directional microphone 47 acquires audio data, and an acceleration sensor 46 acquires acceleration data. The audio data and the acceleration data are inputted to the robot controller 40. Further, the robot controller 40 allows an unillustrated sensor to input a disturbance value of a current thereto. The robot controller 40 performs anomaly detection for a motor (not shown) by machine learning using these three sensors.

The reason for using the microphone 47 as a sensor is that if the motor has an abnormality, abnormal noise is expected to be generated. However, the microphone 47 has many problems in installation location and the like, and requires high installation cost (labor, time, and degree of difficulty for installation). The acceleration sensor 46 is attached to the tip of an arm of the robot 41. When the motor for moving the arm of the robot 41 has an abnormality, vibrations are expected to be generated, or the occurrence tendency of acceleration is expected to change. The acceleration sensor 46 also requires some installation cost. The disturbance value of the current is expected to rise when the motor has an abnormality. Cost for measuring the disturbance value of the current is nearly zero.

The machine learning apparatus 300 performs abnormal value detection using an autoencoder. The number of pieces of data acquired at the time of occurrence of an abnormality is overwhelmingly smaller than the number of pieces of data obtained in normal times. Accordingly, a binary classification model as in an example of application to workpiece scratch inspection shown in FIG. 6 is difficult to apply.

Figure 7:
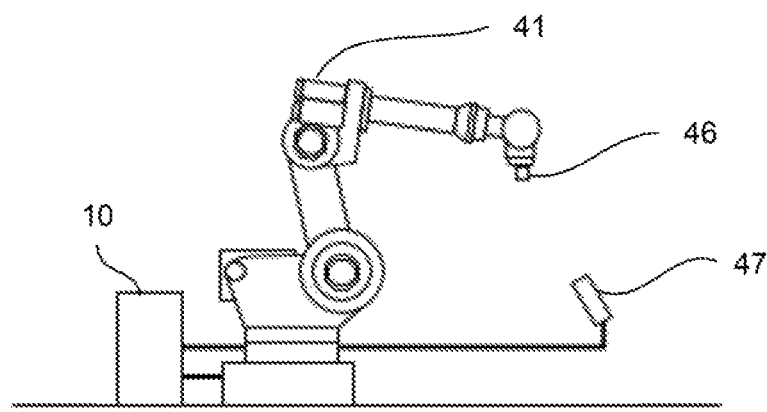
FIG. 7 is a view for explaining an example in which the information processing apparatus according to Embodiment 1 is applied to motor anomaly detection.

Accordingly, in an example of application to motor anomaly detection shown in FIG. 7, a learning phase is performed by using only data obtained in normal times and generating a learning model with an autoencoder. An autoencoder is a multi-layer neural network that performs unsupervised learning, and can provide an output that reproduces an input. An autoencoder has a structure including an input layer, an output layer having the same number of dimensions as the input layer, and one or more intermediate layers that compress inputs to reduce the number of dimensions. An autoencoder determines weights for neurons so that an error between the input layer and the output layer may become as small as possible as learning progresses. When abnormal data are inputted to an autoencoder that has performed learning using only normal data, the autoencoder fails to output a well-reproduced input. In other words, an error between the input and the output becomes large. For such properties of an autoencoder, an autoencoder that has performed learning using only data obtained in normal times can determine that an input given thereto is abnormal data if an error between the input and the output exceeds a predetermined threshold value.

In the example of application shown in FIG. 7, the information processing apparatus 100 (robot controller 40) receives a combination of one or more types of sensor data among three types of sensor data acquired in normal times which include audio data acquired by a directional microphone, acceleration data acquired by an acceleration sensor, and a disturbance value of a current acquired by an unillustrated sensor and generates a learning model. At this time, pre-processing such as a fast Fourier transform can be appropriately performed on raw data outputted by the sensors.

In the information processing apparatus 100, the expected-performance setting section 120 sets expected performance. In this example of application, the following conditions are set as expected performance: recall rate is 99.99% or more, precision rate is 99% or more, and an evaluation value calculated by an original evaluation formula for evaluating cost performance is the most excellent. With this expected performance, a combination of image capture conditions can be obtained which has recall rate and precision rate satisfying requirements and which has most excellent cost performance. The evaluation formula for evaluating cost performance is a sum of weights, where a weight for the use of the directional microphone 47 is +20, a weight for the use of the acceleration sensor 46 is +10, and a weight for the use of a disturbance value of a current is +0. The calculated value (sum of weights) of this evaluation formula decreases with increasing cost performance.

Then, the input data control section 140 sets a selection rule for combinations of sensor data. In this example, combinations of sensors (the directional microphone 47, the acceleration sensor 46, and a disturbance value of a current) are randomly selected.

Subsequently, the input data selection section 110 randomly determines a combination of sensors (the directional microphone 47, the acceleration sensor 46, a disturbance value of a current). The input data selection section 110 repeatedly acquires sensor data with the determined combination of sensors to input the sensor data to the machine learning apparatus 300 as a learner. Thus, a learning model for performing anomaly detection with this combination of sensor data is generated. The input data selection section 110 similarly performs learning for all of randomly-generated combinations of sensors.

Finally, the performance evaluation section 130 performs performance evaluation on all the generated learning models. Specifically, a large number of pieces of test data acquired with the same combination of sensors as that given at the time of learning are inputted to each of the learning models so that the learning model may output a recognition result (that is, whether an anomaly is detected or not). The performance evaluation section 130 cross-checks this recognition result against a correct answer (whether the data are abnormal or not) to calculate recall rate, precision rate, and cost performance (calculated value of the aforementioned evaluation formula). When the performance evaluation section 130 finishes calculating recall rate, precision rate, and cost performance (calculated value of the aforementioned evaluation formula) for all the learning models, the performance evaluation section 130 identifies a learning model which has a recall rate of 99.99% or more and a precision rate of 99% or more and in which the calculated value of the evaluation formula for cost performance is the smallest. The performance evaluation section 130 outputs, as a combination of image capture conditions which has the most excellent performance, the combination of sensors in the learning model thus identified.

This example of application makes it possible to identify sensors necessary for anomaly detection before, for example a line system is introduced. Accordingly, an actual line system can be inexpensively and stably constructed.

Next, an information processing apparatus according to Embodiment 2 of the present invention will be described.

In the information processing apparatus 1 according to the aforementioned Embodiment 1, the input data selection section 110 defines a plurality of combinations of sensor data in accordance with the selection rule set by the input data control section 140, and the machine learning apparatus 300 performs machine learning for each of the combinations.

Meanwhile, in the information processing apparatus of this Embodiment 2, the input data control section 140 further changes the configuration of an intermediate layer of a neural network. Specifically, a hyperparameter of the neural network can be changed. The input data control section 140 retains a plurality of candidates for a setting rule for the hyperparameter of the neural network in advance. Further, the input data control section 140 specifies a setting rule for the hyperparameter of the neural network which should be used with respect to the input data selection section 110.

The input data selection section 110 changes the hyperparameter of the machine learning apparatus 300 in accordance with the specified setting rule for the hyperparameter. After that, the learning process described in the aforementioned Embodiment 1 is executed.

Figure 8:
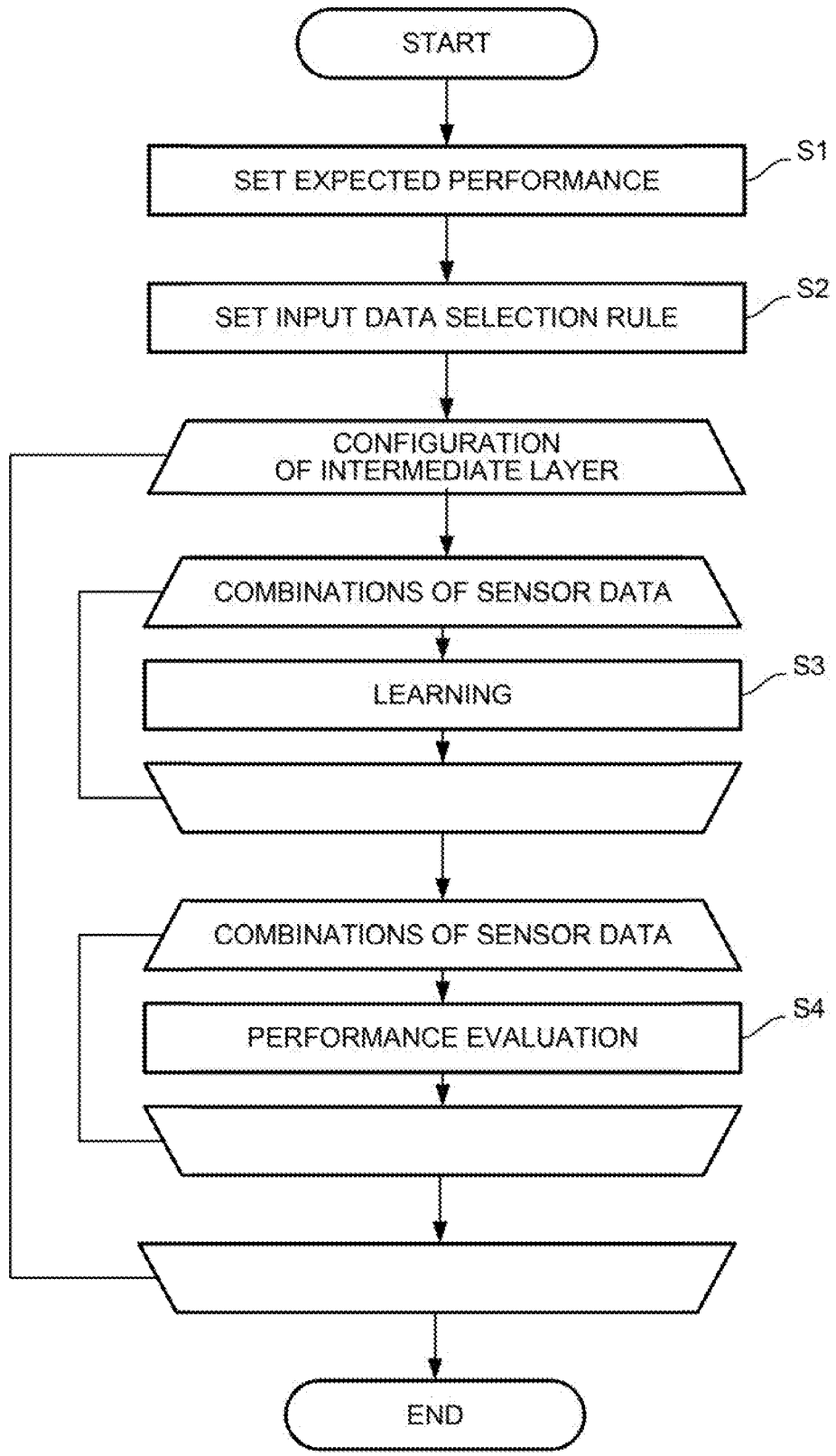
FIG. 8 is a flowchart showing the operation of the information processing apparatus shown in FIG. 2.

A most typical setting rule for the hyperparameter is to randomly set the hyperparameter. Combinatorial optimization may be performed using a genetic algorithm as performed on combinations of sensor data in Embodiment 1. In this case, as shown in the flowchart in FIG. 8, the input data selection section 110 sequentially executes the learning process described in Embodiment 1 for each of respective learners constructed using randomly-selected hyperparameters of the neural network. Also, the performance evaluation section 130 sequentially executes the performance evaluation process described in Embodiment 1 for each of respective recognizers constructed using the hyperparameters.

This information processing apparatus of this Embodiment 2 can identify not only an optimal combination of sensor data but also an optimal hyperparameter of the neural network. Thus, the combination of sensor data can be optimized more. There are cases where because of the bad design of the neural network, a satisfactory recognition result cannot be obtained even though essentially needed sensor data are fully given. In such cases, if the structure of the neural network is exhaustively changed according to the present embodiment, a search space is widened, and an optimal combination of sensor data can be discovered.

While two embodiments of the information processing apparatus of the present invention have been described above, the present invention is not limited to the above-described embodiments, and can be carried out in various aspects by making appropriate modifications thereto.

For example, in the above-described Embodiments 1 and 2, examples have been mainly described in which the information processing apparatus 100 is realized as one apparatus such as a robot controller and acquires sensor data from one controlled object such as a robot. However, the present invention is not limited to this. For example, the information processing apparatus 100 may be disposed on a general-purpose communication network or a dedicated communication network such as factory's internal network to acquire sensor data from a controlled object through the communication network. The information processing apparatus 100 may be one computer or may be realized by a plurality of computers performing processing in a distributed manner. Sensor data for learning or test may be acquired from one controlled object or may be acquired from a plurality of controlled objects of the same type.

Sensor data for learning or test may be data collected in real time or may be data collected and accumulated in a predetermined storage area.

Moreover, in the aforementioned Embodiments 1 and 2, in the information processing apparatus 100, the input data selection section 110 executes the learning process for all of combinations of sensor data, and then the performance evaluation section 130 executes the performance evaluation process for all of learning models obtained. However, for example, after the input data selection section 110 executes the learning process for one combination of sensor data, the performance evaluation section 130 may execute the performance evaluation process for the learning model. In other words, a processing process including learning by the input data selection section 110 and subsequent performance evaluation by the performance evaluation section 130 is repeated as many times as there are combinations of sensor data. In this case, for example, when the performance evaluation section 130 discovers a selection rule exerting favorable performance, repeating the processing may be stopped at that time.

The invention claimed is:

1. An information processing apparatus including a machine learning apparatus configured to receive a plurality of different pieces of sensor data and perform machine learning, the information processing apparatus comprising:
   an input data control section configured to set a selection rule for generating one or more combinations of the sensor data;
   an input data selection section configured to generate a plurality of combinations of the sensor data in accordance with the selection rule, input the combinations of the sensor data to the machine learning apparatus, and generate a recognizer corresponding to each of the combinations of the sensor data;
   an expected-performance setting section configured to set expected performance required for the recognizers; and
   a performance evaluation section configured to evaluate performance of the recognizers in accordance with the expected performance and output the combination of the sensor data corresponding to the recognizer satisfying the expected performance, wherein
   the expected performance is defined using cost for acquiring the sensor data, and
   the cost for acquiring the sensor data is calculated based on a price of a sensor for acquiring the sensor data, a degree of difficulty of installation of the sensor, or time or processing load required for acquiring or processing the sensor data.

2. The information processing apparatus according to claim 1, wherein the expected performance is defined using correct answer rate, precision rate, recall rate, or F value of the recognizer.

3. The information processing apparatus according to claim 1, wherein the sensor data concern at least any one of temperature, displacement, pressure, current, speed, acceleration, image, illuminance, audio, smell and length.

4. The information processing apparatus according to claim 1, wherein the performance evaluation section includes an interface configured to display a plurality of combinations of the sensor data, the combinations satisfying the expected performance, and allow a user to select a desired combination of the sensor data.

5. The information processing apparatus according to claim 1, wherein the recognizer includes a neural network.

6. The information processing apparatus according to claim 5, wherein the input data control section further sets a setting rule for a configuration of an intermediate layer of the neural network.

7. The information processing apparatus according to claim 5, wherein the input data control section has the selection rule for deleting the sensor data having a small coupling coefficient between an input layer and an intermediate layer in the neural network.

8. The information processing apparatus according to claim 5, wherein the input data control section has the selection rule for deleting the sensor data having a low rate of contribution of an intermediate layer to firing at the time of recognition in the neural network.

9. The information processing apparatus according to claim 1, wherein the sensor data are collected from one or more sensors through a communication network.

* * * * *